US007444674B1

(12) United States Patent
Etique et al.

(10) Patent No.: US 7,444,674 B1
(45) Date of Patent: Oct. 28, 2008

(54) END-TO-END SECURITY OF TRANSACTIONS BETWEEN A MOBILE TERMINAL AND AN INTERNET SERVER AT THE APPLICATION LEVEL

(75) Inventors: Pierre-Alain Etique, Hinterkappelen (CH); Adriano Huber, Locarno (CH)

(73) Assignee: Swisscom Mobile AG, Bern (CH)

( * ) Notice: Subject to any disclaimer, the term of this patent is extended or adjusted under 35 U.S.C. 154(b) by 685 days.

(21) Appl. No.: 10/297,949

(22) PCT Filed: Jun. 26, 2000

(86) PCT No.: PCT/CH00/00347

§ 371 (c)(1), (2), (4) Date: Dec. 26, 2002

(87) PCT Pub. No.: WO02/01829

PCT Pub. Date: Jan. 3, 2002

(51) Int. Cl.
*G06F 9/00* (2006.01)

(52) U.S. Cl. ............................... 726/12; 726/3; 726/11; 370/351; 705/79; 709/238; 709/239; 709/240; 713/153; 713/154

(58) Field of Classification Search ..................... 726/3, 726/17
See application file for complete search history.

(56) References Cited

U.S. PATENT DOCUMENTS

| | | | | |
|---|---|---|---|---|
| 6,374,300 | B2 * | 4/2002 | Masters | 709/229 |
| 6,490,624 | B1 * | 12/2002 | Sampson et al. | 709/227 |
| 6,510,439 | B1 * | 1/2003 | Rangarajan et al. | 707/201 |
| 6,606,663 | B1 * | 8/2003 | Liao et al. | 709/229 |
| 6,950,857 | B1 * | 9/2005 | Arnold | 709/217 |
| 2002/0068554 | A1 * | 6/2002 | Dusse | 455/419 |
| 2003/0046533 | A1 * | 3/2003 | Olkin et al. | 713/152 |

FOREIGN PATENT DOCUMENTS

| | | |
|---|---|---|
| EP | 0 991 242 | 4/2000 |
| WO | 99 03243 | 1/1999 |

* cited by examiner

*Primary Examiner*—Kambiz Zand
*Assistant Examiner*—Roderick Tolentino
(74) *Attorney, Agent, or Firm*—Oblon, Spivak, McClelland, Maier & Neustadt, P.C.

(57) ABSTRACT

For end-to-end securing of transactions between a mobile terminal and an Internet server on the application layer, cryptographic transaction identification records, which are directed by the Internet server application to transaction partner applications in the mobile terminal, are stored, assigned to the mobile terminal, in a proxy server. In each case a record identification is transmitted to the mobile terminal for a stored transaction identification record as well as a proxy record, which is calculated by the proxy server from the respective stored transaction identification record. In each case a record identification and a proxy record are taken by the proxy server from the messages directed by the mobile terminal to the Internet server application. The correspondence of the taken proxy record with the proxy record is checked, which is calculable from the stored transaction identification record determined through the taken record identification, and, in the case of agreement, the stored transaction identification record determined through the taken record identification is transmitted to the Internet server application.

19 Claims, 2 Drawing Sheets

END-TO-END SECURITY OF TRANSACTIONS BETWEEN A MOBILE TERMINAL AND AN INTERNET SERVER AT THE APPLICATION LEVEL

The present invention relates to a method and a server suitable therefor for end-to-end securing of transactions between a mobile terminal and an Internet server on the application level. In particular the present invention relates to a method and a proxy server suitable therefor for end-to-end securing of transactions on the application level between a mobile terminal and an Internet server comprising at least one Internet server application which, for unambiguous identification of an application transaction, transmits transaction identification records to the transaction partner application and receives transaction identification records which are transmitted back to the Internet server application from the transaction partner application for unambiguous identification of the application transaction.

The use of transaction identification records for identification of transactions and sessions between Internet servers (or web servers) and terminals of users (personal computers, for example), or respectively the applications on these terminals (for example browsers, for example) is known. Means of exchange of transaction identification records, which are known above all by the name of "cookies", were introduced by the company Netscape in order to be better able to handle interactions on the application level between web servers and browsers, since the hypertext transport protocol (HTTP) lying beneath is a connection-less request/response protocol (and therefore does not have any state management). The cookies by means of which transaction identification records are able to be transmitted, are transmitted from the web server to the browser when the user contacts the web server with the browser, for example for the first time. Received cookies are typically stored by the browser on the hard memory disk of the terminal. The instruction to the browser to store a cookie reads, for instance, as follows: set cookie: name="value"; expires="date"; path="path"; domain="domain name"; secure. After successful storing of a cookie, the browser transmits the value of the cookie in the HTTP request data prefix to the respective web server when the browser is instructed by the user to obtain an URL address whose domain name and path correspond to the values set for the cookie. If the option "secure" is set, this takes place only if the transmission is carried out via a secure connection, for instance via a set-up session of the secure socket layer (SSL). Thus, by means of the cookies, interactions between the user of the browser and the web server can be handled through applications of the web server for longer periods, e.g. minutes or years, and for a plurality of request/response cycles, it being possible to differentiate between sessions of different users and transactions.

By means of the mechanisms of the secure socket layer used in the Internet, an encrypted pipe can be set up between the client terminal, on which the browser runs, and the respective web server which secures the confidentiality of the data exchanged, i.e. <prevents> the unauthorized access to the exchanged data, and makes possible the checking of the authenticity of the participating transaction partners (client and server), for instance through log in of the user by means of user name, user password, one-time user password (e.g. from cancel list or secure ID) or other known mechanisms.

Particularly security-critical applications, such as e.g. home banking and e-commerce, which are implemented in the Internet, present high security requirements with respect to the confidentiality of the data, the authenticity of the participating transaction partners, the integrity of the data and often also with respect to the indisputability of the origin of the data or respectively of the transactions for which the data are exchanged. The necessary security is achieved preferably through an end-to-end securing of the transactions between the transaction partners on the application level, i.e. through mechanisms of the applications and not through mechanisms of the underlying protocol layers. In this connection, a solution based on SSL presents the problem that an unauthorized hacker who can penetrate into the system between the SSL layer and the application level can insert false requests into the application transactions, which has problematic consequences in particular for security-critical applications. Above and beyond this, an error in the handling of the sessions on the SSL layer can lead to a request or a response being incorrectly assigned to a wrong application transaction, which likewise has problematic consequences.

In order to be able to avoid these problems, the previously described mechanism of the cookies can be used such that requests are each transmitted to the server with a cookie (and a transaction identification record contained therein), so that the transactions are each able to be unambiguously identified on the application level. To prevent an attack by the above-mentioned unauthorized hacker who inserts false requests into the application transactions between the SSL layer and the application level, the transaction identification records (in the cookies) are each provided with cryptographic elements. If such cryptographic transaction identification records are supposed to meet high security requirements, they typically become rather long; for instance, required for a digital signature with 1024 bits is a cookie (with the transaction identification record contained therein) with a length of 160 bytes.

Although with the method derived from the state of the art for end-to-end securing of transactions between terminals and Internet servers on the application level based on cryptographic transaction identification records transmitted in cookies, it is possible to overcome the above-mentioned problems of false requests, this method cannot be used for mobile terminals, for example mobile radio telephones or mobile communication-capable computers such as laptop computers, palmtop computers or PDAs (Personal Digital Assistants), on the one hand because the available mobile terminals are not provided with communications protocols which support cookies (e.g. the wireless application protocol WAP used in mobile devices for access to the Internet does not support any cookies), and, on the other hand, because the required lengths of the cryptographic transaction identification records are not very efficient for mobile communication.

It is an object of this invention to propose a new and better method as well as means suitable therefor which make possible end-to-end securing of transactions between a mobile terminal and an Internet server on the application level.

This object is achieved according to the present invention in particular through the elements of the independent claims. Further preferred embodiments follow moreover from the dependent claims and the description.

This object is achieved through the present invention in particular in that cryptographic transaction identification records (contained in cookies, for instance) which are directed to transaction partner applications in the mobile terminal are stored, assigned to the mobile terminal, in a transaction identification proxy record server, that a record identification for a respective stored transaction identification record as well as a proxy record calculated by the proxy server from the respective stored transaction identification record are transmitted in each case by the proxy server to the mobile terminal, that a record identification and a proxy record are taken in each case by the proxy server from the messages which are sent by the mobile terminal to the Internet server application, and checked is the correspondence between the taken proxy record and the proxy record which is calculable from the stored transaction identification record determined through the taken record identification, and in that, in the case of a correspondence, the stored transaction identification record determined through the taken record identification is transmitted to the Internet server application. The advantage of the proxy server, which <replaces> in each case a transaction identification record directed to a mobile terminal with a tuple, consisting of a record identification for the respective stored transaction identification record and a proxy record, which is calculated from the respective transaction identification record, is in particular that the mechanism of the transaction identification records (cookies) used by the Internet server can be mapped on mobile terminals which do not support this mechanism, the end-to-end security between the mobile terminal and the Internet-server on the application level remains intact through the cryptographic proxy record which is calculated from the respective transaction identification record and which can have a much shorter length than the transaction identification record from which it is calculated. The record identification alone could be faked by a hacker; the proxy record calculated in each case from the respective transaction identification record is not able to be faked by a hacker, however, since the transaction identification records can change with each transaction and the correspondence of the tuple is checked by the proxy server.

The record identification and proxy record to be transmitted to the mobile terminal are preferably transmitted in a data element which is automatically inserted into messages in each case by the transaction partner application in the mobile terminal, which messages are directed to the Internet server application. This procedure has the advantage in particular that the mobile terminal, or respectively software programs of the mobile terminal, do not need to be adapted as well.

The proxy record is preferably calculated from the stored transaction identification record by means of a one-way hash function. The advantage of using a one-way hash function for calculation of the proxy record from the transaction identification record is in particular that, on the one hand, the calculation of the proxy record from the transaction identification record can be carried out easily, but, in the reverse direction, the calculation of the transaction identification record from the proxy record is extremely difficult, if not impossible, and that, on the other hand, a proxy record with a predefined length can be calculated from the transaction identification record even when the length of the transaction identification record varies, whereby in particular the predefined length of the proxy record is shorter than the length of the transaction identification record from which it is calculated.

In an embodiment variant, the assignment to the mobile terminal during the storing of the cryptographic transaction identification in the proxy server takes place via the IP address of the mobile terminal. This is especially advantageous when no other data element that could serve for identification of the mobile terminal is exchanged between the mobile terminal and the Internet server by means of the communication protocols used.

In an embodiment variant, a protocol data file is kept in the proxy server in which are stored indications about the replacement of transaction identification records with proxy records, or respectively proxy records with transaction identification records, indications about the point in time of this replacement as well as indications about the transaction partners participating in the transaction for which the replacement is carried out. The advantage of such a protocol data file is in particular that it can be used at a later point in time to prove the transaction course carried out on the application level between the mobile terminal and the Internet server.

In alternative embodiment variants the proxy server is insertable into the communication path between the Internet server application and the transport security layer of the Internet server and is implemented with the Internet server on a common computer, or the proxy server is implemented on a common computer with a gateway that links together a mobile radio network and the Internet and is insertable in the communication path between the transport security layer of the mobile network and the transport security layer of the Internet.

An embodiment of the present invention will be described with reference to an example. The example of the embodiment is illustrated by the following appended figures.

Figure 1:
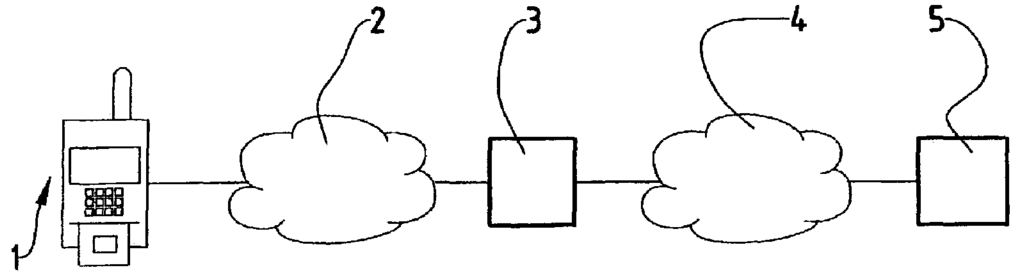
FIG. 1 shows a block diagram which illustrates schematically a mobile terminal and an Internet server which communicate via a gateway that connects a mobile radio network and the Internet.

In FIG. 1 the reference numeral 1 refers to a mobile terminal, for example a WAP-capable mobile terminal, which can communicate over a mobile radio network 2, for instance a GSM or UMTS or another, e.g. satellite-based, mobile radio network. As is shown schematically in FIG. 1, the mobile radio network 2 is connected via a gateway 3, for example a WAP gateway, to the Internet 4, to which an Internet server 5 is linked.

Figure 2:
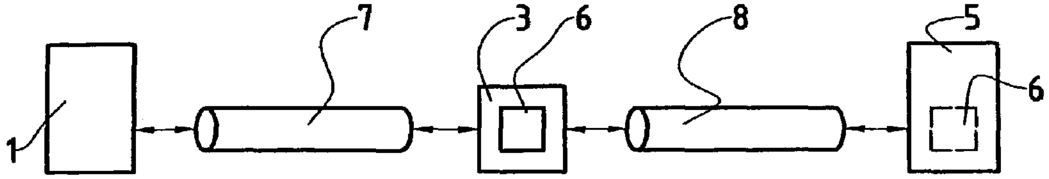
FIG. 2 shows a block diagram which illustrates schematically a mobile terminal and an Internet server which communicate via a gateway that connects together a mobile radio network security pipe and an Internet security pipe.

Illustrated in FIG. 2 is the configuration illustrated in FIG. 1 with respect to the transport security layer between the mobile terminal 1 and the Internet server 5, whereby shown in an abstract way as the mobile network security pipe 7 is the mobile radio network 2 as well as the communication protocols of the mobile terminal 1 and of the gateway 3 for access to, and communication processing via, the mobile radio network 2, up to and including the transport security layer, for instance according to the WTLS protocol (Wireless Transport Layer Security) and whereby shown in an abstract way as the Internet security pipe 8 is the Internet 4 as well as the communication protocols of the gateway 3 and of the Internet server 5 for access to, and communication processing via, the Internet 4, up to and including the transport security layer, for instance according to the SSL protocol (Secure Socket Layer). The reference numeral 6 in FIG. 2 refers to a transaction identification proxy record server which will be explained more closely in the following and is designated in an abbreviated way as the proxy server 6. The proxy server 6 is implemented preferably as a programmed software module on a computer. As shown in FIG. 2, the proxy server 6 can be implemented on a common computer with the gateway 3 (block 6 with solid line), where it is inserted in the communication path between the Internet server 5, or respectively an Internet server application, and the mobile network security pipe 7, or the proxy server 6 can be implemented on a common computer with the Internet server 5 (block 6 with broken line), where it is inserted in the communication path between the Internet server 5, or respectively an Internet server application, and the Internet security pipe 8.

Figure 3:
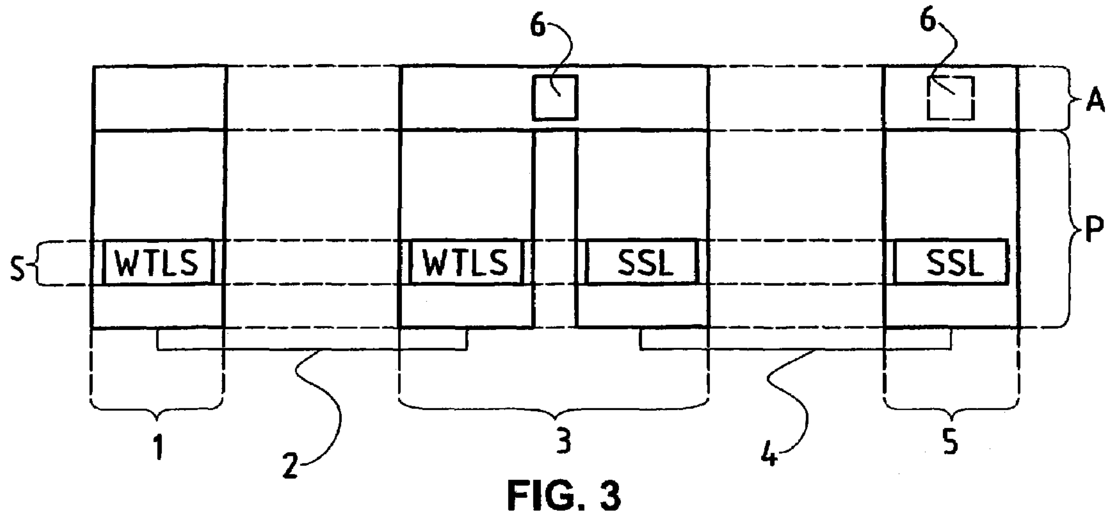
FIG. 3 shows a layer diagram, which illustrates schematically the communication protocol stack of a mobile terminal, of an Internet server as well as of the gateway via which the mobile terminal and the Internet server communicate with one another.

Shown in FIG. 3 are the communication protocol stack P as well as the above-lying application level A in a schematic layer model for the mobile terminal 1, the gateway 3 and the Internet server 5. Only the transport security layer S is emphasized thereby as a layer in FIG. 3, the WTLS protocol being used, for example, as the transport security layer for the communication over the mobile radio network 2 between the mobile terminal 1 and the gateway 3, and the SSL protocol being used, for example, for the communication over the Internet 4 between the gateway 3 and the Internet server 5. The communication protocol stack P in the mobile terminal 1 and in the gateway 3 for communication over mobile radio network 2 are executed according to WAP (Wireless Application Protocol), for example. As shown furthermore in FIG. 3, the proxy server 6 can be carried out on the application level A, as already indicated above, together with the gateway 3 or with the Internet server 5 on one computer.

Figure 4:
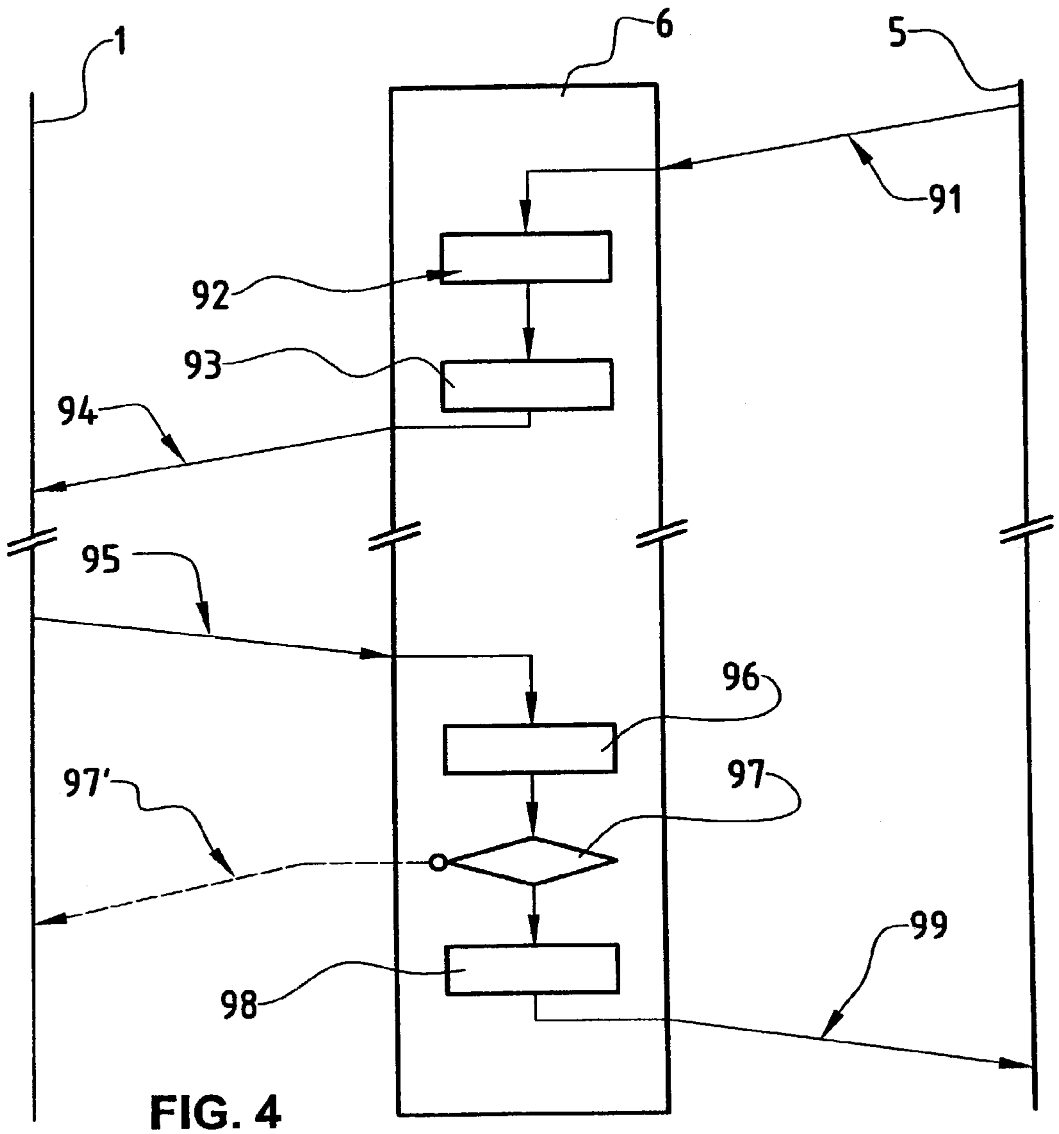
FIG. 4 shows a combined time and flow chart in which the exchange is illustrated schematically of transaction identification records, or respectively proxy record calculated from these transaction identification records, for the end-to-end securing of transactions on the application level between a mobile terminal and an Internet server, as transaction partners, via a proxy server.
Figure 5:
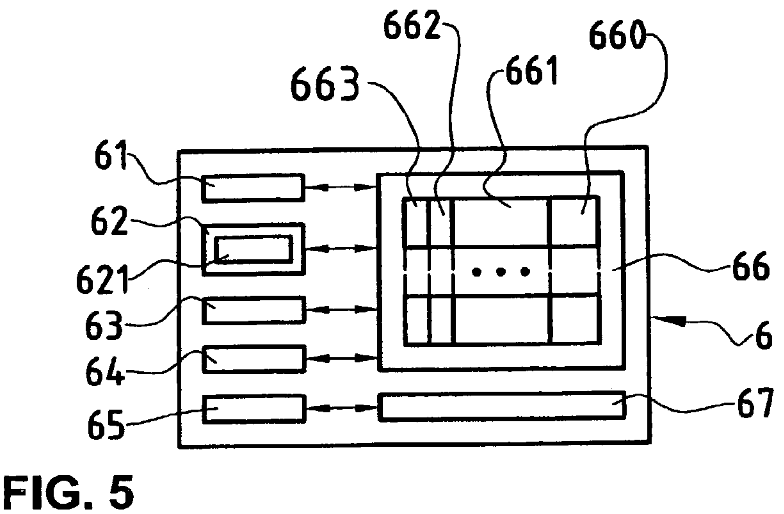
FIG. 5 shows a block diagram which illustrates schematically a proxy server.

In FIG. 4, the reference numeral 91 refers to the transmission of a cryptographic transaction identification record directed to the mobile terminal 1, or respectively to an application of the mobile terminal 1, through the Internet server 5, or respectively an Internet server application of the Internet server 5. The proxy server 6, which is inserted in the communication path between the Internet server 5 and the mobile terminal 1, receives the cryptographic transaction identification record by means of the record storing module 61 shown in FIG. 5, and stores it in step 92 in the record mapping memory 66. The transaction identification record comprises, for instance, a digital signature as the cryptographic element. The storing of the cryptographic transaction identification record takes place with assignment to the mobile terminal 1, a mobile terminal identification 662 being assigned to the stored cryptographic transaction identification record 661. Used as the mobile terminal identification 662 can be, for example, the IP address (Internet Protocol) of the mobile terminal 1 to which the respective message with the cryptographic transaction identification record is directed.

In step 93, in the proxy server 6, an unambiguous (unique) proxy record is calculated from the stored transaction identification record 661 by means of the proxy record module 62. The calculation of the proxy record takes place through a cryptographic function 621, for instance through a one-way hash function 621, e.g. a hash function according to MD5 or SHA1. As indicated by the arrow 94 in the figure, the calculated proxy record is transmitted from the proxy record module 62 to the mobile terminal 1 together with a record identification for the stored transaction identification record 661 with the aid of the communication functions of the Internet server 1 <sic. 5> or of the gateway 3, depending upon where the proxy server 6 is implemented. Used as the record identification can be, for example, the mobile terminal identification 662 or another record identification 663 generated by the proxy server 6. The calculated proxy record 660 can also be stored in addition in the record mapping memory 66. The cryptographic function 621 can furthermore secure the uniqueness of newly calculated proxy records on the basis of the previously stored proxy record 660. If the cryptographic function 621 determines that a calculated proxy record corresponds to a previously stored proxy record 660, the uniqueness can be brought about through the cryptographic function 621, for instance by means of data values from a random generator. The uniqueness of proxy records can also be achieved by the cryptographic function 621, however, by addition of data elements, for instance time-dependent values or serial numbers, to the cryptographically calculated proxy record. The tuple is preferably transmitted with the proxy record 660 and the record identification 662 or 663 in a data element which is inserted in each case automatically into messages by the application in the mobile terminal 1, which messages are directed to the Internet server 5, or respectively the Internet server application. The tuple can be added to the URL address (Uniform Resource Locator), for instance, which is put on each object, for example HTML (Hypertext Markup Language) or WML pages (Wireless Markup Language) that is transmitted by the Internet server 5, or respectively the Internet server application, to the mobile terminal 1, or respectively a transaction partner application on the mobile terminal 1, for instance a WAP browser, and which is transmitted in each case by these applications of the mobile terminal 1 with each request to the Internet server 5 or respectively to the particular Internet server application.

Illustrated by the arrow 95 in FIG. 4 is the transmission by the mobile terminal 1, or respectively by an application of the mobile terminal 1, of a message directed to the Internet server 5, or respectively the Internet server application, comprising the tuple with the calculated proxy record and the record identification. In step 96, this message is taken in the proxy server from the tuple with the proxy record and the record identification by means of the proxy record checking module 63, and in step 97 checked is the correspondence of the taken proxy record to the proxy record which is calculable from the stored transaction identification record 661 determined through the taken record identification. For the check, either a proxy record is thereby calculated from the stored transaction identification record 661 determined through the taken record identification, or the corresponding previously calculated and stored proxy record 660 is used, whereby calculating time can be saved. In the case of a positive correspondence, the stored transaction identification record 661 determined through the taken record identification is transmitted to the respective Internet server application in step 98, as indicated by the arrow 99, by means of the record transmission module 64 with the aid of software interfaces of the Internet server 1 <sic. 5> or communication functions of the gateway 3, depending upon where the proxy server 6 is implemented. If there is no correspondence, an error message can be transmitted to the mobile terminal 1, for example, as illustrated by the arrow 97'.

In an embodiment variant, the protocol data file 67 is kept in the proxy server 6 by the protocol data file capturing module 65, in which protocol data file information is stored concerning the steps 92, 93, 96, 97 and 98 carried out by the proxy server together with time and/or date indications for the point in time of execution of these steps. This information comprises, for example, indications about which transaction identification records have been received from the Internet server 5 and have been stored, with which proxy records these transaction identification records have been replaced, to which mobile terminal 1 the proxy records have been transmitted in each case, from which mobile terminal 1 the proxy records have been transmitted back, which proxy records have been incorrectly kept back in the proxy server 6 and which transaction identification records have been successfully transmitted back to the Internet server 5, or respectively the particular Internet server application. The protocol data file capturing module 65 is a programmed software module, for example. The protocol data file 67 is stored on a hard memory disk organized in a data file or a database.

| List of Reference Numerals | |
|---|---|
| 1 | mobile terminal |
| 2 | mobile radio network |
| 3 | gateway |
| 4 | Internet |
| 5 | Internet server |
| 6 | proxy server |
| 7 | mobile network security pipe |
| 8 | Internet security pipe |
| 61 | record storing module |
| 62 | proxy record module |
| 63 | proxy record checking module |
| 64 | record transmitting module |
| 65 | protocol data file capturing module |
| 66 | record mapping memory |
| 67 | protocol data file |
| 91 | step: transmission of a transaction identification record |
| 92 | step: storing of a transaction identification record |
| 93 | step: calculation of a proxy record |
| 94, 95 | step: transmission of a record identification and of a proxy record |
| 96 | step: taking of the record identification and of the proxy record |
| 97 | step: checking of the proxy record |
| 97' | step: error message |
| 98, 99 | step: transmission of a transaction identification record |
| 621 | cryptographic function (one-way hash function) |
| 660 | proxy record |
| 661 | stored transaction identification record |
| 662 | mobile terminal identification |
| 663 | record identification |
| A | application level |
| P | communications protocol stack |
| S | transport security layer |
| SSL | secure socket layer |
| WTLS | wireless transport layer security |

The invention claimed is:

1. A method for end-to-end securing of transactions between a mobile terminal and an Internet server on an application level, in which method, for unambiguous identification of an application transaction, an Internet server application transmits transaction identification records to a transaction partner application and receives transaction identification records that are transmitted back to the Internet server application from the transaction partner application, for unambiguous identification of the application transaction, the method comprising:

transmitting a cryptographic transaction identification record, which is directed to transaction partner applications in the mobile terminal, from the Internet server to a proxy server;

storing, on the proxy server assigned to the mobile terminal, the cryptographic transaction identification record;

transmitting to the mobile terminal by the proxy server using a wireless protocol that does not support cookies, in each case, a first record identification corresponding to the stored cryptographic transaction identification record in the proxy server;

transmitting to the mobile terminal a first proxy record from the proxy server, said first proxy record calculated by the proxy server from the stored cryptographic transaction identification record, and said first proxy record produced being of a different form from the stored cryptographic transaction identification record;

taking in each case by the proxy server from messages directed by the mobile terminal to the Internet server application a second record identification and a second proxy record, said second proxy record based on the first proxy record received at the mobile terminal from the proxy server;

checking for a correspondence of the second proxy record with the first proxy record; and transmitting, in a case of there being a positive correspondence between the first and second proxy records, to the Internet server application the stored cryptographic transaction identification record, determined through the first record identification.

2. The method according to claim 1, wherein the first record identification and the first proxy record to be transmitted to the mobile terminal are transmitted in a data element that is automatically inserted by the transaction partner application in the mobile terminal in each case into messages that are directed to the Internet server application.

3. The method according to claim 1, wherein the first proxy record is calculated from the stored cryptographic transaction identification record by a one-way hash function.

4. The method according to claim 1, wherein during the storing of the cryptographic transaction identification record in the proxy server, assignment to the mobile terminal takes place by an IP address of the mobile terminal.

5. The method according to claim 1, wherein a protocol data file is kept in the proxy server, in which protocol data file are stored data about replacement of transaction identification records with proxy records, respectively of proxy records with transaction identification records, data about a point in time of the replacement, and data about the transaction partners participating in the transaction for which the replacement is made.

6. A proxy server, which is insertable in a communication path between a mobile terminal and an Internet server, which Internet server comprises at least one Internet server application, which, for unambiguous identification of an application transaction, transmits transaction identification records to a transaction partner application and receives transaction identification records that are transmitted back to the Internet server application by the transaction partner application, for unambiguous identification of the application transaction, the proxy server comprising:

first means for transmitting a cryptographic transaction identification record, which is directed to transaction partner applications in the mobile terminal, from the Internet server to a proxy server;

second, means for storing, on the proxy server, the cryptographic transaction identification record that is directed to the transaction partner applications in the mobile terminal, whereby the storing takes place assigned to the mobile terminal;

third, means for calculating a first proxy record from the stored cryptographic transaction identification record and for transmitting to the mobile terminal, using a wireless protocol that does not support cookies, the first proxy record as well as a first record identification for corresponding to the stored cryptographic transaction identification record, said first proxy record produced being of a different form from the stored cryptographic transaction identification record;

fourth, means for taking a second record identification and a second proxy record from messages that are directed from the mobile terminal to the Internet server application, said second proxy record based on the first proxy record received at the mobile terminal from the proxy server, and for checking for a correspondence of the second proxy record to the first proxy record; and fifth, means for transmitting, in a case of there being a positive correspondence between the first and second proxy records, to the Internet server application the stored cryptographic transaction identification record determined through the first record identification.

7. The proxy server according to claim 6, wherein the second means are set to transmit in a data stream the first record identification and the first proxy record to be transmitted to the mobile terminal, the first record identification and the first proxy record being automatically inserted by the transaction partner application in the mobile terminal into messages that are directed to the Internet server application.

8. The proxy server according to claim 6, wherein the second means comprises a one-way hash function by which the first proxy record is calculated from the stored cryptographic transaction identification record.

9. The proxy server according to claim 6, wherein the first means are set such that, during storing of the cryptographic transaction identification record, the first means carries out assignment to the mobile terminal by an IP address of the mobile terminal.

10. The proxy server according to claim 6, wherein the proxy server comprises further means for keeping a protocol data file in which are stored data about replacement of transaction identification records with proxy records, respectively of proxy records with transaction identification records, data about a point in time of the replacement, and data about the transaction partners taking part in the transaction for which the replacement is made.

11. The proxy server according to claim 6, wherein the proxy server is implemented with the Internet server on a common computer and is in a communication path between the Internet server application and a transport security layer of the Internet server.

12. The proxy server according to claim 6, wherein the proxy server is implemented with a gateway, connecting together a mobile radio network and the Internet, on a common computer, and is in a communication path between a transport security layer of the mobile radio network and a transport security layer of the Internet.

13. A proxy server, which is insertable in a communication path between a mobile terminal and an Internet server, which Internet server comprises at least one Internet server application, which, for unambiguous identification of an application transaction, transmits transaction identification records to a transaction partner application and receives transaction identification records that are transmitted back to the Internet server application by the transaction partner application, for unambiguous identification of the application transaction, the proxy server comprising:

a transmitter configured to transmitting a cryptographic transaction identification record, which is directed to transaction partner applications in the mobile terminal, from the Internet server to a proxy server;

a memory unit configured to store, on the proxy server, the cryptographic transaction identification record that is directed to the transaction partner applications in the mobile terminal, whereby the storing takes place assigned to the mobile terminal;

a first unit configured to calculate a first proxy record from the stored cryptographic transaction identification record and to transmit to the mobile terminal, using a wireless protocol that does not support cookies, the first proxy record and a first record identification corresponding to the stored cryptographic transaction identification record, said first proxy record produced being of a different form from the stored cryptographic transaction identification record; and a second unit configured to obtain a second record identification and a second proxy record from messages directed from the mobile terminal to the Internet server application, wherein said second proxy record is based on the first proxy record received at the mobile terminal from the proxy server; and said second unit is configured to check for a correspondence of the second proxy record to the first proxy record and to transmit, in a case of there being a positive correspondence between the first and second proxy records, to the Internet server application the stored cryptographic transaction identification record determined through the first record identification.

14. The method according to claim 1, wherein the transmitting to the mobile terminal a first proxy record comprises transmitting a record of shorter length than the stored cryptographic transaction identification record.

15. The method according to claim 1, wherein the transmitting to the mobile terminal a first proxy record comprises transmitting a record in which a tuple replaced the stored cryptographic transaction identification record.

16. The proxy server according to claim 6, wherein the first proxy record comprises a record of shorter length than the stored cryptographic transaction identification record.

17. The proxy server according to claim 6, wherein the first proxy record comprises a tuple replacing the stored cryptographic transaction identification record.

18. The proxy server according to claim 13, wherein the first proxy record comprises a record of shorter length than the stored cryptographic transaction identification record.

19. The proxy server according to claim 13, wherein the first proxy record comprises a tuple replacing the stored cryptographic transaction identification record.

* * * * *